April 26, 1949.  H. E. RUE  2,468,236
DEVICE FOR FEEDING STRIP MATERIAL
Filed Feb. 15, 1946  3 Sheets-Sheet 1

INVENTOR
HAROLD E. RUE
BY
ATTORNEYS

April 26, 1949.   H. E. RUE   2,468,236
DEVICE FOR FEEDING STRIP MATERIAL
Filed Feb. 15, 1946   3 Sheets-Sheet 2

INVENTOR
HAROLD E. RUE
BY
ATTORNEYS

April 26, 1949.  H. E. RUE  2,468,236
DEVICE FOR FEEDING STRIP MATERIAL
Filed Feb. 15, 1946.  3 Sheets-Sheet 3
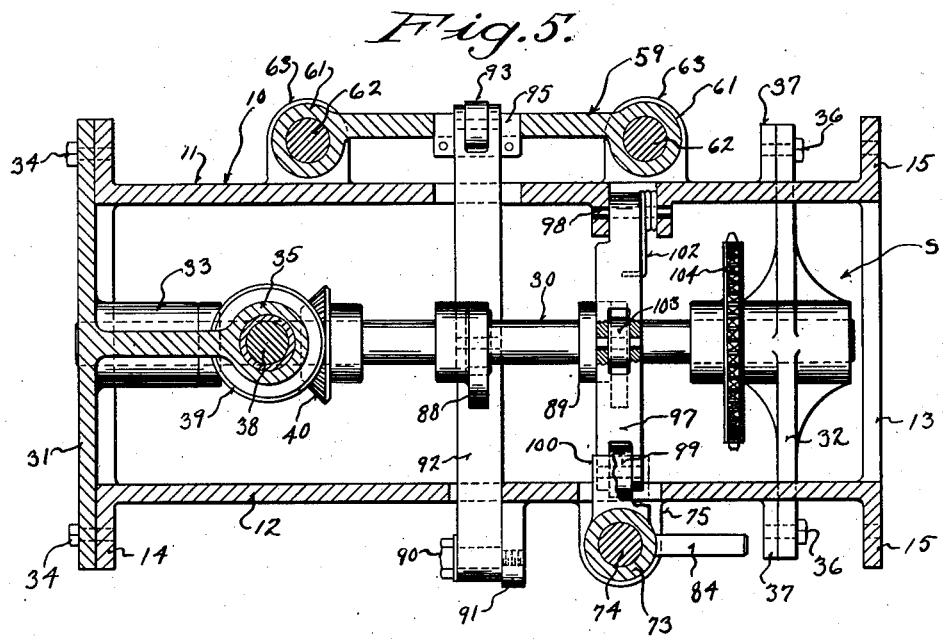
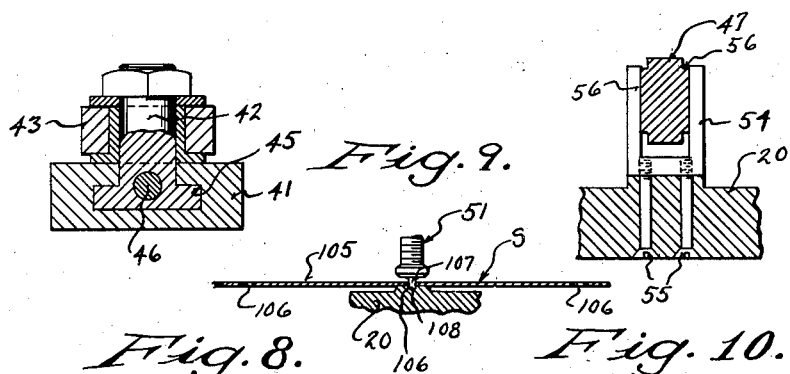
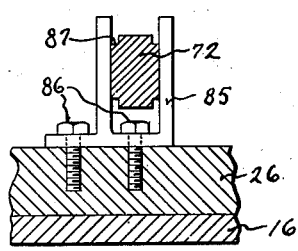
INVENTOR
HAROLD E. RUE
BY
ATTORNEYS Patented Apr. 26, 1949

2,468,236

UNITED STATES PATENT OFFICE 2,468,236

DEVICE FOR FEEDING STRIP MATERIAL

Harold E. Rue, Wauwatosa, Wis.

Application February 15, 1946, Serial No. 647,917

13 Claims. (Cl. 271—2.5)

1

This invention appertains to devices for automatically feeding material to an operating machine, such as a printing press, embossing machine, cutting or punching machine, etc., and more particularly to a novel machine for feeding strip material in a step by step movement to such printing press, or the like.

One of the primary objects of my invention is to provide an extremely accurate machine, which will advance the strip material an exact desired distance on each operating cycle thereof, whereby such material can be effectively acted upon by the printing or other receiving machine.

Another salient object of my invention is to provide a simple mechanism for regulating the active stroke of the machine, so that the machine can be accurately set for advancing the strip the exact desired amount.

A further object of my invention is to provide a strip advancing machine in which the alternately operating strip engaging clamps or fingers are both mounted upon and carried directly by the frame of the machine, whereby a simplified mechanism will be had and whereby the clamps can be efficiently operated from a single timing cam shaft.

A further important object of my invention is to provide novel means for moving one of the strip engaging fingers or clamps with the reciprocating strip advancing slide plate, so that the said clamp or finger will always be accurately located relative to the strip on the slide plate.

A still further object of my invention is to provide means whereby the strip engaging clamps or fingers can be easily and quickly set or adjusted relative to the slide and the work table, whereby different thicknesses of material can be effectively accommodated, and means whereby either one or both of the clamps or fingers can be quickly raised, by an operator, away from the slide and table during the initial placing of the strip in position, and the like.

A still further important object of my invention is to provide novel and simple form of mechanism for operating the strip engaging fingers in proper timed relation from a driving cam shaft, said shaft being adapted to be operated in proper timed relation direct from the printing or other receiving machine.

A still further object of my invention is to provide a material advancing machine which may be constructed as a separate unit for attachment to an operating machine and driven in timed relation thereto; or, which may be designed and incorporated as an integral part of an operating

2 machine at the time of construction, with means for driving in timed relation thereby.

A still further object of my invention is to provide a machine which can be effectively used for advancing a strip of printed or woven labels, or the like, novel means being provided for engaging and cooperating with the strip for insuring the movement of the strip the exact correct distance, whereby the labels will be fed at all times in proper alignment to a cutting or other operating machine.

A still further object of my invention is to provide a strip feeding machine which will be durable and efficient in use, one that will be simple and easy to manufacture and maintain in working condition, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 5 is a horizontal sectional view taken on the line 5—5 of Figure 1, looking in the direction of the arrows, and illustrating the single drive shaft for the cams and for the reciprocating slide plate.

Figure 6 is an enlarged fragmentary detail vertical sectional view taken substantially on the line 6—6 of Figure 1, looking in the direction of the arrows, illustrating the mounting of the crank pin for the connecting rod of the slide plate.

Figure 7 is an enlarged detail vertical sectional view taken substantially on the line 7—7 of Figure 3, illustrating the guide carried by the slide plate for the rocker arm of the clamping finger, which cooperates with the slide plate.

Figure 8 is a similar view, but taken on the line 8—8 of Figure 4 and illustrating the guide for the operating arm for the clamping finger which cooperates with the work table.

Figure 9 is a fragmentary longitudinal sectional view illustrating a slightly modified form of my invention for advancing a strip of printed or woven labels, or the like, and Figure 10 is a fragmentary top plan view of the strip of printed or woven labels, constructed in accordance with my invention.

Figure 1:
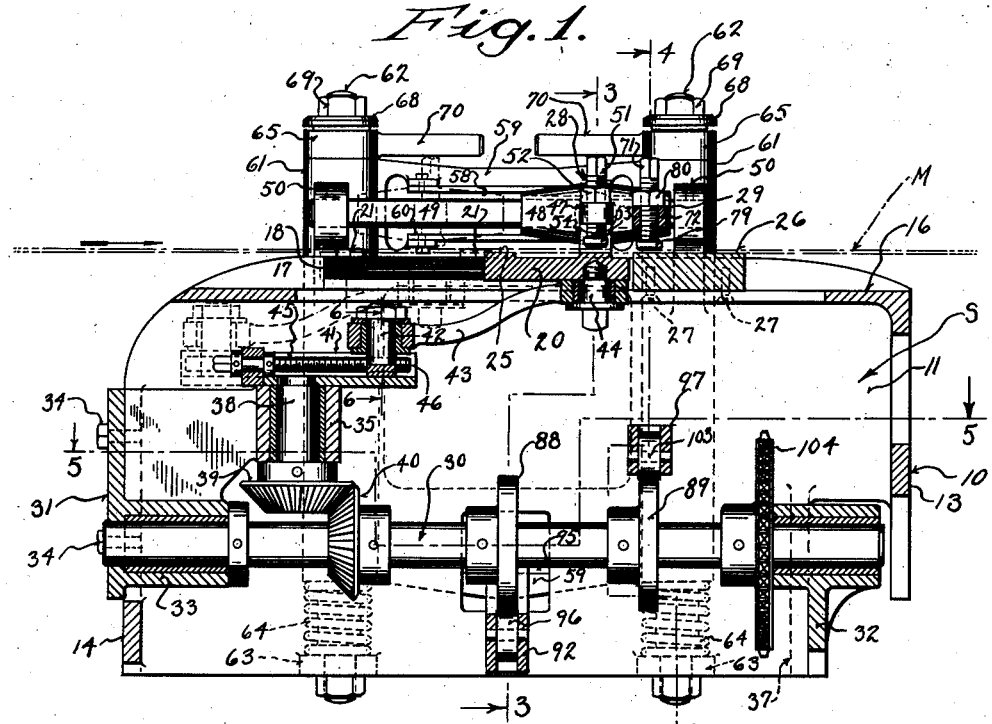
Figure 1 is a central longitudinal sectional view through my improved strip feeding machine, the section being taken substantially on the line 1—1 of Figure 2, looking in the direction of the arrows.
Figure 2:
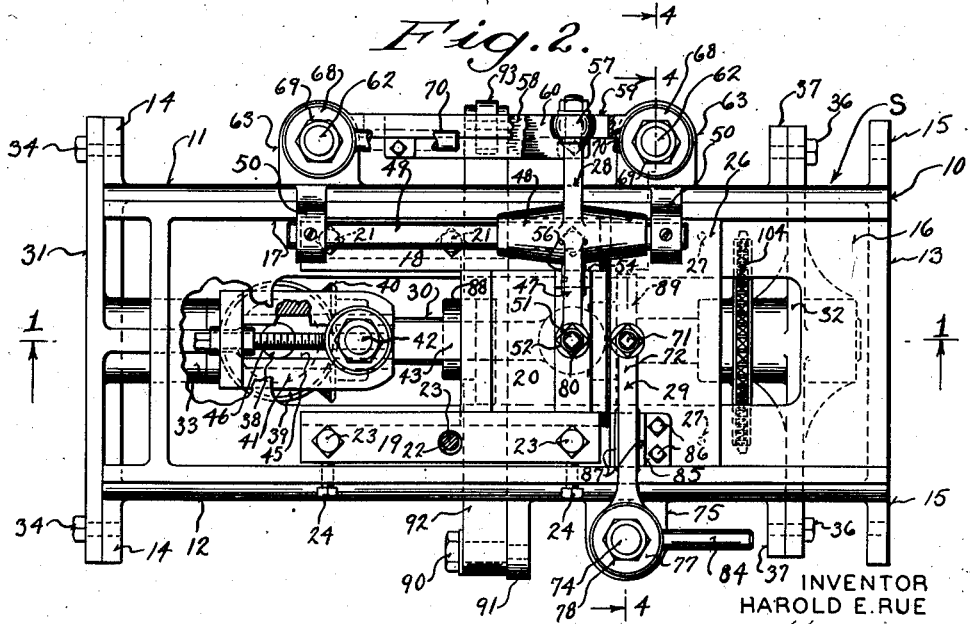
Figure 2 is a top plan view of the machine, with parts thereof broken away and in section to illustrate structural detail.

Referring to the drawing in detail, wherein similar reference characters designate corresponding parts throughout the several views, the letter S generally indicates my improved strip feeding machine, and the same includes a supporting frame 10. This frame, in turn, can be mounted upon any suitable type of supporting work table and can be connected directly with the receiving machine which my device is feeding the strip to. The frame 10 can be formed in the nature of a casting, if so desired, and as illustrated, the same includes a pair of spaced parallel side walls 11 and 12 connected together by an end wall 13. The terminals of the side walls 11 and 12 can be provided respectively with outwardly extending flanges 14 and 15. The side walls 11 and 12 can be connected by an open frame-like top wall 16 and the side walls and the top wall are so constructed as to provide longitudinally extending spaced parallel guideways 17. Mounted in the guideways are spaced parallel gibs 18 and 19, the inner faces of which are dovetailed to receive the bearing edges of a reciprocating slide plate 20. The gib 18 can be securely bolted in its guideway by machine bolts 21. The other gib 19 is mounted in its guideway so that the same can be adjusted toward and away from the slide plate to compensate for wear and the like. As shown, the gib 19 is provided with slots 22 through which extend holding bolts 23. By loosening these bolts, the gib can be slid laterally in its guideway and this can be accomplished by means of adjusting screws 24 carried by the frame, and these adjusting screws bear against the outer side edge of the gib 19.

The slide plate 20 is preferably, but not necessarily, formed from hard metal, and the same can be provided with raised transversely extending smooth ribs 25 on which the strip rests. Also mounted in the guideway 17 is the work table 26 and this work table is directly in front of the slide plate 20. The work table preferably has its upper face polished and the same can be secured to the frame in any desired way, such as by machine screws 27.

The strip of material M (see Figure 1) is adapted to travel longitudinally of the machine and over the work table 26 and the slide plate 20. At certain times, means is provided for clamping the strip of material M to the slide plate so that the material can be advanced with the slide plate as the plate moves forwardly. This means is generally indicated by the reference character 28 and will be later described in detail. Upon the return stroke of the slide plate 20, the clamping means operating with the slide plate is released and means 29 is employed for clamping the material to the work table 26 so that the work or material will be held firmly in position against accidental movement during the backward movement of the slide plate. This means will also be described in detail.

The means for reciprocating the slide plate will now be described, and at the outset, it is to be noted that I provide a single drive shaft 30 and all of the operating mechanism is driven from this shaft. The shaft 30 extends longitudinally of the machine below the slide plate 20 and the work table 26 and the opposite ends thereof are rotatably mounted in suitable bearings carried by bearing brackets 31 and 32. The bearing bracket 31 is provided with a bearing sleeve 33 for receiving the drive shaft and this bracket is securely bolted, as at 34, to the flanges 14 on the frame. This bracket is also provided with a right angularly extending bearing sleeve 35, for a purpose, which will be later set forth. The bearing bracket 32 is bolted, as at 36, to suitable flanges or ears 37 formed on the frame.

Rotatably mounted in suitable bearings carried by the sleeve 35 is a driven shaft 38. The driven shaft 38 can be operated from the drive shaft 30 through the use of beveled gears 39 and 40, keyed or otherwise fastened respectively to the shafts 38 and 30. The upper end of the driven shaft 38 has secured thereto a crank disc or a crank 41 of particular form which will be later described. The crank carries an adjustable crank pin 42 to which is operatively connected a connecting rod 43. The connecting rod in turn is operatively connected to a bearing pin 44 carried by the bottom of the slide plate 20. Hence, during the rotation of the shaft 38, the slide plate 20 will be reciprocated back and forth toward and away from the work table 26.

Referring to the crank 41, the same is provided with a longitudinally extending guideway 45 in which is slidably mounted the crank pin 42. The inner end of the crank arm rotatably carries a feed screw 46 and this screw is threaded into the crank pin 42. Hence, by turning the feed screw one way or the other, the pin can be moved longitudinally along the length of the crank arm so that the active working stroke of the slide plate can be regulated or set. One end of the feed screw 46 can be provided with a head to facilitate the rotation thereof. After an adjustment is made, the nut on top of the pin 42 is tightened and the screw is held in its adjusted position against accidental rotation by stop collars.

The means 28 for releasably clamping the strip of material M to the slide plate 20 during its forward movement, includes a rocker arm 47 and this arm, at a point intermediate its ends, is provided with a hub sleeve 48. The hub sleeve is slidably and rockably mounted upon a polished horizontally disposed guide rod 49. The ends of the guide rod are mounted in and secured to ears or cuffs 50 formed on the frame 10. The inner end of the rocker arm 47 receives a clamping finger 51 which is located directly above and centrally of the slide plate. The clamping finger is in the nature of a screw and is screw threaded in the rocker arm whereby the lower end of said finger can be accurately adjusted relative to the slide table and the material M. The upper end of the finger can be provided with a polygonal head to facilitate the turning thereof, and a lock nut 52 can be provided for holding the finger in an adjusted accurate set position. The lower end of the finger is provided with the gripping head 53 for engaging the strip of material M.

From the description so far, it can be seen that the rocker arm 47 and the clamping finger are carried by the frame, and I provide means for sliding the rocker arm and the finger with the slide plate 20 during the reciprocation thereof. This means consists of a U-shaped guide 54 rigidly secured as at 55 to the upper face of the slide plate 20 at one side of the longitudinal axis of said slide plate. The rocker arm 47 is received between the legs of the U-shaped guide and the rocker arm at this point can be provided with wear surfaces 56. Obviously, the legs of the guide 54 engaging the opposite sides of the rocker arm 47 will carry the rocker arm with the slide plate.

The outer end of the rocker arm 47 carries an anti-friction roller 57 which is received in a guide track 58 carried by a vertically disposed reciprocating carriage 59. If desired, the active faces of the guide track 58 can be provided with removable wear plates 60.

The reciprocating carriage 59 is in the nature of an open frame and the sides thereof are provided with vertically disposed guide sleeves 61. These guide sleeves 61 are slidably mounted upon upright spaced parallel guide posts 62 which can be rigidly secured to laterally extending ears 63 formed on the wall 11 of the frame 10.

Expansion springs 64 of the desired tension are coiled about the posts 62 and are disposed between the ears 63 and the lower ends of the sleeves 61, and consequently the carriage 59 is normally urged upwardly. Upward movement of the carriage transmits a downward movement to the clamping finger 51 and means is provided for moving the carriage downwardly against the tension of the springs 64 at certain timed intervals, as will also be hereinafter more fully set forth.

Means is provided for holding the clamping finger 51 above the work during the initial threading of the work strip through the machine, and this means can include rotatable heads 65, rotatably mounted on the upper ends of the posts 62. The lower faces of the rotatable heads 65 and the upper faces of the carriage sleeves 61 are provided with mating cam surfaces 66 and light tension coil springs 67 are provided for normally holding the heads in engagement with the sleeves. The upper ends of the posts can be reduced in diameter to provide stop shoulders on which are fitted washers 68, and these washers are held against the stop shoulders and the light tension springs 67 by nuts 69 threaded on the upper ends of the posts. The rotatable cam heads 65 can be provided with radially extending manipulating handles 70 and by grasping these handles and turning the cam heads until the high points of the cam heads rest on the high points of the cam faces on the carriage sleeves 61, the carriage can be moved downwardly against the tension of the heavy coil springs 64. This will move the clamping finger above the work strip M.

The means 29 for holding the work at spaced times on the work table 26, includes a clamping finger 71. This finger is preferably in longitudinal alignment with the finger 51 and the same is carried by the inner end of an operating arm 72. The outer end of the operating arm is formed on or secured to a vertically disposed guide sleeve 73. This guide sleeve is slidably mounted on a vertically disposed polished guide rod 74, the lower end of which is securely fastened to a laterally extending ear 75 formed on the side wall 12 of the frame 10. A relatively heavy spring 76 is coiled about the rod 74 and one end of the spring bears against the vertically movable guide sleeve 73 and against a washer 77 held on the guide rod 74 by a nut 78. Hence, the spring 76 normally functions to lower the arm 72 and the clamping finger 71, to firmly clamp the strip of material M to the work table 26.

Mechanism operating in proper timed relation to the carriage 59 is provided for raising the arm 72 and the finger 71 at the proper times. The finger 71 is in the nature of a screw and is threaded into the inner end of the arm 72. The upper end of the screw is provided with a polygonal head for facilitating the adjustment thereof and the lower end of the screw carries a clamping head 79. A lock nut 80 is provided for holding the finger in its set adjusted position, and hence the finger can be accurately set and held relative to the thickness of the material.

In order to hold the finger in a raised position above the strip of material and the work table 26 so that the strip of material can be initially placed in the machine, the lower end of the sleeve 73 is provided with a cam face 81 for mating engagement with a rotatable cam head 82. This cam head 82 is rotatably mounted on the rod 74 between the lower end of the sleeve and the laterally extending ear 75. A light coil spring 83 is provided for normally holding the cam head in engagement with the sleeve. Formed on or carried by the cam head 82 is a radially extending operating handle 84 and by grasping the handle and turning the head, the high points of the cam head can be moved to engagement with the high points of the cam surface on the sleeve. This will raise the arm 72 and the clamping finger will be moved and held away from the strip of material M.

A substantially U-shaped guide bracket 85 is provided for the arm 72 and this guide bracket is secured as at 86 to the work table 26. The lever or arm 72 is received between the legs of the bracket and the opposite sides of the lever or arm can be provided with wear surfaces 87. Thus the arm 72 and the finger 71 are held secure against any but vertical movement.

The means for operating the carriage 61 for the clamping finger 51 and the sleeve 73 for the clamping finger 71 will now be described. The operating shaft 30 is provided with a pair of spaced operating cams 88 and 89 and these cams can be keyed or otherwise secured to the shaft 30. The cams are of similar contour and the high parts thereof are arranged in a predetermined manner relative to one another for a purpose, which will later appear.

Figure 3:
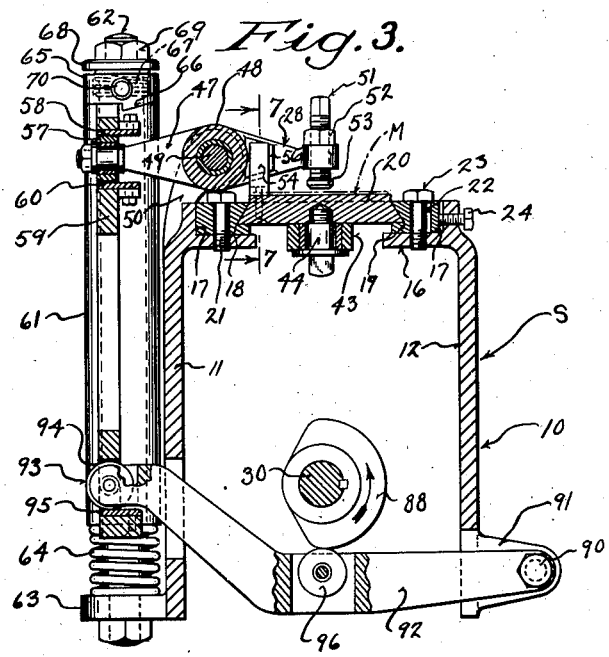
Figure 3 is a transverse sectional view through the machine taken substantially on the line 3—3 of Figure 1, looking in the direction of the arrows, the view illustrating the mechanism for operating the clamping finger for engaging the work on the slide.

Rockably mounted upon a pivot pin 90, carried by an ear 91 on the frame 10, is the operating lever 92 for the carriage 61, and this lever extends transversely across the frame 10 and its outer end is provided with an anti-friction roller 93. The roller 93 is received within a guide opening 94 formed in the carriage and the lower wall of this opening can be provided with a removable wear plate 95. The thrust of the roller and lever is in a downward path against the springs 64 and consequently the wear plate is needed at this point. The lever intermediate its ends carries an anti-friction roller 96 and this roller is adapted to ride against the cam 88. It can be seen that during the rotation of the cam 88, the lever 92 will be depressed when the roller 96 is riding on the high part of the cam. When the carriage 61 is moved downwardly by the lever 92, the finger 51 will be raised off of the strip, as shown in Figure 3. Attention is called to the fact that the movement of the lever 92 is very slight, and the lever can only move upward a slight distance when the roller rides off of the high part of the cam in view of the engagement of the finger 51 with the material M on the slide table 20. Thus by proper use of the adjusting means for finger 51, a very rapid engagement and disengagement of the clamping head 53 with the material M is obtained.

Figure 4:
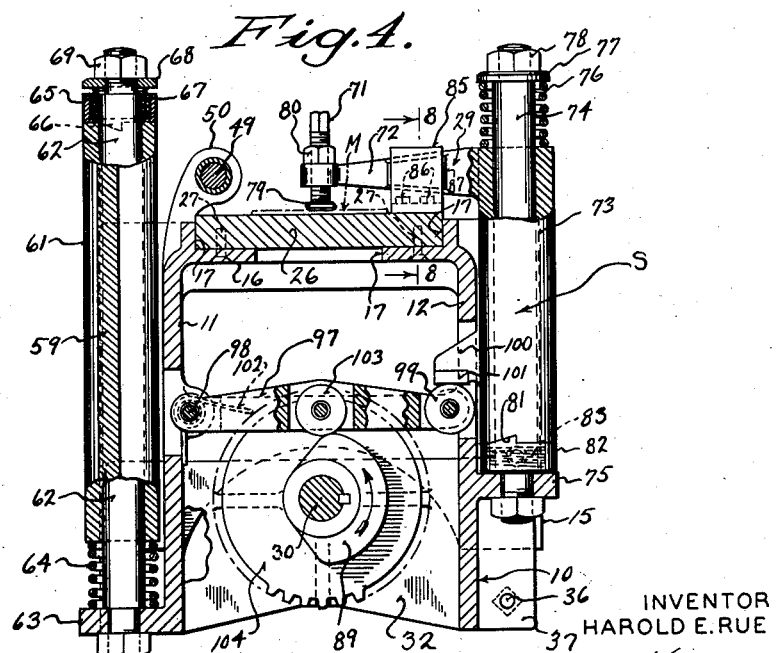
Figure 4 is a transverse sectional view through the machine taken substantially on the line 4—4 of Figure 1, looking in the direction of the arrows, illustrating more particularly the mechanism for operating the clamping finger for the work table.

An operating lever 97 is provided for the sleeve 73 and this lever likewise extends transversely across the frame, but is disposed above the shaft 30. One end of the lever 97 is rockably mounted upon a pivot pin 98 and the opposite end of the lever carries an anti-friction roller 99 which normally bears against an ear 100 formed on the sleeve. This ear can also be provided with a hardened wear plate 101. A spring 102 can be provided for holding the roller 99 against the wear plate at all times. The lever 97 carries intermediate its ends an anti-friction roller 103 and this roller rides on the periphery of the cam 89. When the roller 103 is on the high part of this cam, the sleeve 73 will be raised a slight distance and the finger 71 will be moved above the work. It is to be noted that the movement of the lever 97 is slight, and as shown in Figure 4, the roller 103 is just starting to ride on the high part of the cam, and when the roller reaches the high part of the cam, the finger 71 will be raised its desired slight distance above the strip of material. The roller 103 and its lever 97 only moves a slight distance down off of the high part of the cam in view of the engagement of the finger 71 with the strip. Thus, by proper use of the adjusting means for finger 71, a very rapid engagement and disengagement of the clamping head 79 with the material M is obtained.

The shaft 30 can be driven in proper timed relation to the machine receiving the strip of material M and the shaft can be operated directly from this machine. As illustrated, I have shown a sprocket wheel 104 for receiving a drive chain (not shown), when the strip feed machine is used as an attachment to an operating machine. When the strip feed machine is incorporated as an integral part of an operating machine, shaft 30 might be an extension of the main shaft of said operating machine.

In operation of my strip feeding machine, the fingers 51 and 71 are raised above the slide plate 20 and the work table 26, respectively, by means of the cam heads 65 and 82, previously described, after which the work is placed in the machine over the slide plate and work table and under the clamping fingers. With fingers 51 and 71 in raised position, clamping heads 53 and 79 are adjusted to the correct clearance distance above the strip of material M and the slide plate and the work table, then the cam heads are turned back to their normal position. Considering that the finger 51 is in its lowered position at the start of the effective stroke, gripping the work, and clamping the same to the slide plate, and that the finger 71 is in its raised position, upon rotation of the shaft 30, the slide plate 20 will move forwardly (to the right, Figure 1) and the strip will be carried therewith for the exact distance of the effective stroke of the slide plate. After the slide plate reaches the end of its effective stroke, the finger 51 is raised and the roller 96 will be riding on the high part of the cam. At this time, the finger 71 is lowered into contact with the work or strip and clamps the same to the table 26. At this time, the roller 103 will be off of the high part of its cam 89. Upon the return movement of the slide plate 20, the strip will be firmly held against movement and the slide plate will move under the strip. This operation is continued and the strip will be advanced in a step by step movement the exact desired distance.

It is to be again noted at this point that the clamping fingers and the slide plate are all operated from the drive shaft 30.

Means can be provided for preventing lateral shifting of the strip of material M so as to maintain the longitudinal axis of the strip coincident with the longitudinal axis of the slide plate 20.

My machine has been designed to accurately feed a strip of material an exact distance on each operating cycle of the machine. This is highly important in advancing printed or woven labels to a cutting or other operating machine, and obviously, if the labels are off only a slight fraction of an inch on each operating cycle, in due time the labels would be out of proper registry or alignment with a cutting mechanism. To eliminate this possibility, I have devised a novel label strip S (see Figures 9 and 10) for cooperation with the gripping finger 51 for the slide plate 20. In accordance with my invention, the strip S between each label 105 is provided with an opening 106. These openings are in longitudinal alignment and the purpose thereof will now be described. The finger 51 is provided with a depending axially disposed centering point 107, and this point is adapted to enter into an opening 106 in the label strip S between a pair of labels on the slide plate 20. The slide plate 20 itself can be provided with an opening or cavity 108 for receiving the centering point.

In operation of this form of my invention, the centering point, on the downward movement of the finger 51, will enter into an opening 106 directly below the same and will tend to center the label strip on the slide plate. Upon forward movement of the slide plate, the point 107 will bear against the front portion of the wall of the mentioned opening 106. Consequently, it can be seen that the label strip is advanced in a step by step movement by the engagement of the finger with the front part of the wall of the opening 106 and hence, on each operating cycle of the machine, a label will be advanced the exact and correct distance.

Changes in details may be made without departing from the spirit or the scope of my invention, but what I claim as new is:

1. A strip feeding mechanism comprising a support, a slide plate reciprocally mounted upon the support, a work table, the strip being movable over the work table and slide plate, a strip holding clamp finger for the table carried by the support, a strip holding finger for the slide plate, slidably and rockably mounted on the support independent of the slide plate, means for reciprocating the slide plate means fastened to the slide plate and engaging the strip holding finger for the slide plate to reciprocate it in synchronism with the slide plate, and means for alternately raising and lowering the clamping fingers.

2. A strip feeding mechanism comprising a support, a work table on the support over which the strip travels, a reciprocating slide plate on the support receiving the strip, a clamping finger for the slide plate rockably and slidably mounted upon the support independent of the slide plate, means for raising and lowering the clamp finger into and out of engagement with the strip, means fastened on the slide plate engaging the finger to reciprocate the finger in unison with the slide plate, a second strip clamping finger mounted on said support movable into and out of engagement with the strip on the table, means for raising and lowering the finger into and out of engagement with the strip, one of said fingers being in clamping engagement with the strip when the other of said fingers is out of clamping engagement with the strip.

3. A strip feeding mechanism comprising a support, a slide plate reciprocally mounted upon the support receiving the strip, a work table on said support over which the strip travels, a carriage reciprocally mounted on said support, an operating lever rockably and slidably mounted on the support, means for operating the lever from the carriage, means for raising and lowering the carriage, a clamp finger carried by the lever for engaging the portion of the strip on the slide plate, means carried by the slide plate engaging said lever at all times for sliding the lever with said slide plate, and a strip clamping finger carried by said support movable into and out of engagement with that portion of the strip on said table.

4. A strip feeding mechanism comprising a support, a slide plate reciprocally mounted upon the support, a work table, the strip being movable over the work table and slide plate, a strip holding clamp finger for the table carried by the support, a strip holding finger for the slide plate slidably and rockably mounted upon the support independent of the slide plate, means for reciprocating the slide plate means fastened to the slide plate and engaging the strip holding finger for the slide plate to reciprocate said finger in unison with the slide plate, means for alternately raising and lowering the clamping fingers, and means for adjusting the clamping fingers relative to the slide plate and table whereby different thicknesses of material can be accommodated.

5. A strip feeding machine comprising a support, a slide plate reciprocally mounted on the support for receiving the strip, a work table on the support over which the strip travels, said work table and slide plate being arranged longitudinally of the support, a horizontally disposed work shaft rotatably carried by the support and extending longitudinally thereof below the work table and slide plate, means for reciprocating the slide plate from the shaft, spaced strip gripping members mounted independently of one another on said support, one of said gripping members being disposed above the work table and the other of said members being disposed above the slide plate, means for moving the last mentioned member with the slide plate, and means for alternately raising and lowering the members from said shaft.

6. A strip feeding machine comprising a support, a work table on the support over which the strip travels, a slide plate on the support for receiving the strip, said table and slide plate being arranged longitudinally of the support, a horizontally disposed shaft arranged longitudinally of the support below the table and slide plate carried by the support, means for reciprocating the slide plate from the shaft, means for adjusting the distance of travel of the slide plate, work gripping members arranged in spaced relation carried by the support, one of said gripping members being arranged above the table and the other of said members being arranged above the slide plate, means for sliding the last mentioned member with the slide plate, and means for alternately raising and lowering the gripping members into and out of gripping contact with the strip from said shaft.

7. A strip feeding machine comprising a support, a slide plate reciprocally mounted on the support for receiving the strip, a work table on the support over which the strip travels, said work table and slide plate being arranged longitudinally of the support, a horizontally disposed work shaft rotatably carried by the support and extending longitudinally thereof below the work table and slide plate, means for reciprocating the slide plate from the shaft, spaced strip gripping members mounted independently of one another on said support, one of said gripping members being disposed above the work table and the other of said members being disposed above the slide plate, means for moving the last mentioned member with the slide plate, means for alternately raising and lowering the members from said shaft, and means for initially adjusting the gripping members relative to the work.

8. A machine for feeding strip material a measured distance in a step by step movement comprising a support, a work table on the support over which the strip travels, a slide plate on the support for receiving the strip, means for reciprocating the slide plate, means for clamping the strip on the slide plate during the movement of the slide plate in one direction, including a vertically movable carriage, a rock arm slidably and rockably mounted on the support, means operatively connecting one end of said lever to the carriage, spring means normally holding the carriage in one position, means for moving the carriage against said spring means a limited distance, a gripping member on said lever disposed directly above the slide plate and means connecting the slide plate with the rock lever for sliding the rock lever with said slide plate.

9. A machine for feeding strip material a measured distance in a step by step movement comprising a support, a work table on the support over which the strip travels, a slide plate on the support for receiving the strip, means for reciprocating the slide plate, means for clamping the strip on the slide plate during the movement of the slide plate in one direction, including a vertically movable carriage, a rock arm slidably and rockably mounted on the support, means operatively connecting one end of said lever to the carriage, spring means normally holding the carriage in one position, means for moving the carriage against said spring means a limited distance, a gripping member on said lever disposed directly above the slide plate, means connecting the slide plate with the rock lever for sliding the rock lever with said slide plate, and means for adjusting the gripping member on the rock lever relative to the slide plate and strip.

10. A machine for feeding strip material a measured distance in a step by step movement comprising a support, a work table on the support over which the strip travels, a slide plate on the support for receiving the strip, means for reciprocating the slide plate, means for clamping the strip on the slide plate during the movement of the slide plate in one direction, including a vertically movable carriage, a rock arm slidably and rockably mounted on the support, means operatively connecting one end of said lever to the carriage, spring means normally holding the carriage in one position, means for moving the carriage against said spring means a limited distance, a gripping member on said lever disposed directly above the slide plate, means connecting the slide plate with the rock lever for sliding the rock lever with said slide plate, and manually operable means for holding the gripping member above the slide plate whereby to permit the initial placing of the strip over the slide table.

11. A machine for feeding strip material an exact distance in a step by step movement, comprising a support, a work table on the support over which the strip travels, a slide plate on the support receiving the strip, means for reciprocating the slide plate, spaced gripping members for the strip, arranged respectively above the slide plate and the work table, means slidably and rockably mounting the gripping member above the slide plate on the support independently of the slide plate, means mounting the gripping member above the table to the support, means fastened to the slide plate and engaging the gripping member arranged above the same to reciprocate it in synchronism with the slide plate, means for alternately raising and lowering the gripping members into and out of gripping contact with the strip, and manually operable means for holding the gripping members above the strip and the slide plate and table to permit the initial threading of the strip in the machine.

12. A machine for feeding strip material an exact desired distance in a step by step movement, comprising a support, a table on the support over which the strip travels, a slide plate on the support receiving the strip, means for reciprocating the slide plate, means for releasably clamping the strip to the slide plate during the movement of the slide plate in one direction, means for clamping the strip to the table during the movement of the slide plate in the opposite direction, said means for releasably gripping the work on the slide plate including a lever slidably and rockably mounted upon the support, and a gripping member on the lever, means fastened to the slide plate and engaging the gripping member to reciprocate it in synchronism with the slide plate, a vertically movable carriage, means operatively connecting the lever to the carriage, spring means normally holding the carriage in a raised position with the gripping member in contact with the strip, an operating shaft, a cam on said shaft for moving the carriage against the tension of said spring means, said means for releasably clamping the strip on the table including a vertically movable arm mounted on the support, a gripping member on the arm, spring means normally holding the arm down with the gripping member in gripping contact with the strip, a second cam on said shaft for operating the arm against the tension of said spring means, and means for driving the shaft.

13. A machine for feeding strip material an exact desired distance in a step by step movement, comprising a support, a table on the support over which the strip travels, a slide plate on the support receiving the strip, means for reciprocating the slide plate, means for releasably clamping the strip to the slide plate during the movement of the slide plate in one direction, means for clamping the strip to the table during the movement of the slide plate in the opposite direction, said means for releasably gripping the work on the slide plate including a lever slidably and rockably mounted upon the support independent of the slide plate and a gripping member on the lever, means fastened to the slide plate and engaging the gripping member to reciprocate it in synchronism with the slide plate, a vertically movable carriage, means operatively connecting the lever to the carriage, spring means normally holding the carraige in a raised position with the gripping member in contact with the strip, an operating shaft, a cam on said shaft for moving the carriage against the tension of said spring means, said means for releasably clamping the strip on the table including a vertically movable arm mounted on the support, a gripping member on the arm, spring means normally holding the arm down with the gripping member in gripping contact with the strip, a second cam on said shaft for operating the arm against the tension of said spring means, means for driving the shaft, and manually operable means for operating the carriage and the arm against the tension of said spring means whereby to hold the gripping members out of clamping contact with the strip so as to permit the initial placing of the strip over the table and slide plate and under said gripping members.

HAROLD E. RUE.

REFERENCES CITED

The following references are of record in the file of this patent:

UNITED STATES PATENTS

| Number | Name | Date |
|---|---|---|
| 162,341 | Beecher | Apr. 20, 1875 |
| 1,375,889 | Baltzley | Apr. 26, 1921 |
| 1,946,874 | Nicholas | Feb. 13, 1934 |
| 1,987,872 | Rosenthal | Jan. 15, 1938 |
| 2,128,964 | Pityo | Sept. 6, 1938 |
| 2,278,921 | Fischer | Apr. 7, 1942 |